United States Patent [19]

Tailor et al.

[11] Patent Number: 4,472,468

[45] Date of Patent: Sep. 18, 1984

[54] HEAT SHRINKABLE COVERING AND METHOD FOR APPLYING SAME

[75] Inventors: Dilip K. Tailor, Bramalea; Robert E. Steele, Mississauga; James L. Smythe; Real R. Dezainde, both of Huntsville, all of Canada

[73] Assignee: Shaw Industries Limited, Rexdale, Canada

[21] Appl. No.: 454,041

[22] Filed: Dec. 28, 1982

[30] Foreign Application Priority Data

Nov. 12, 1982 [CA] Canada ............................ 415413

[51] Int. Cl.³ ............................................ B32B 7/00
[52] U.S. Cl. ...................................... 428/57; 156/86; 156/308.4; 428/349; 174/DIG. 8
[58] Field of Search ............... 428/36, 57, 200, 345, 428/346, 347, 349; 174/DIG. 8; 156/54, 86, 308.2, 308.4

[56] References Cited

U.S. PATENT DOCUMENTS

| | | | |
|---|---|---|---|
| 3,749,622 | 7/1973 | Sato et al. | 156/308.2 |
| 3,847,721 | 11/1974 | Evans | 138/156 |
| 3,899,807 | 8/1975 | Sovish et al. | 138/168 |
| 3,959,052 | 5/1976 | Stanek | 428/36 |
| 4,080,235 | 3/1978 | Mandersson | 156/308.4 |
| 4,356,222 | 10/1982 | Harakawa et al. | 428/346 |
| 4,359,502 | 11/1982 | Caponigro et al. | 428/345 |

Primary Examiner—John E. Kittle
Attorney, Agent, or Firm—Ridout & Maybee

[57] ABSTRACT

A heat shrinkable covering for an article, such as a pipe, comprises a heat shrinkable material in the form of a flexible sheet which is wrapped around the article so that its ends overlap. The overlapping end portions are bonded together by means of a hold-down adhesive, preferably a shear-resistant adhesive, leaving an adhesive-free region at the interface. Heat is applied externally to the overlapping end portions so as to effect a fusion bond at the adhesive-free region of the interface, and the sheet is heat-shrunk onto the article in known manner. The covering offers the advantages and convenience of application common to conventional wrap-around sleeves, while having the intrinsic strength properties of a seamless tubular sleeve.

45 Claims, 8 Drawing Figures

HEAT SHRINKABLE COVERING AND METHOD FOR APPLYING SAME

FIELD OF THE INVENTION

This invention relates to heat shrinkable protective coverings such as, for example, heat shrinkable polymeric sleeves which may be used in a variety of applications to seal and/or protect pipe weld joints, telephone cables, electrical splices, pipelines and the like, from adverse environmental conditions such as corrosion and moisture.

BACKGROUND OF THE INVENTION

Heat shrinkable coverings for these purposes are currently of two general types. One such covering, as described for example in U.S. Pat. No. 3,297,819 to J. D. Wetmore, comprises essentially a tubular sleeve of heat shrinkable material, typically a crosslinked polymer having an elastic memory, which has been stretched to a dimensionally heat unstable form. In application the tubular sleeve is passed onto the exposed end of the pipe or other article to be covered and is shrunk by the application of heat into close fitting relationship with the article. While this type of covering has the advantage of making a complete and continuous seal around the article, and is not liable to failure except from any inherent weakness in the material of the sleeve, it has certain disadvantages. One obvious disadvantage is that the covering can only be applied if the article to be covered has an exposed end over which the sleeve can be passed. Another disadvantage is that the usefulness of the sleeve is limited to a range of article sizes for which the sleeve diameter is intended. Yet another disadvantage results from the inherent difficulty of extruding sleeves for, say, pipes of large diameter.

The other general type of heat shrinkable covering is represented by the so-called "wrap-around sleeve", one example of which is disclosed in U.S. Pat. No. 4,200,676 to D. A. Caponigro. While wrap-around sleeves are more versatile than tubular sleeves in that they can be readily applied to articles, including large diameter pipes, which do not have an accessible exposed end, the closure systems by which the adjoining ends of the sleeve are interconnected are an inherent source of weakness. Mechanical closure systems are especially vulnerable to damage, while conventionally bonded overlaps can permit slippage during application and subsequently creep due to the hoop stresses remaining in the shrunk sleeves and so render the sleeves less effective than those which have a continuous covering.

SUMMARY OF THE INVENTION

It is an object of the present invention to provide an improved heat shrinkable covering, and a method of applying the covering to an article, by which the above-mentioned disadvantages are substantially overcome. This is achieved, basically, by providing a wrap-around sleeve which, prior to, during or after its being heat shrunk onto the article to be covered, is converted into a continuous, that is to say a substantially seamless, tubular sleeve by fusion bonding its overlapping end portions together. In this way, the resultant covering is formed without a seam which would be an inherent source of weakness, but instead has strength properties equivalent to those of a conventional seamless tubular sleeve.

According to one aspect of the present invention, in a method of applying a close fitting protective covering to an article to be covered, there is first provided a dimensionally heat unstable material in sheet form having longitudinally spaced end portions, the material having been stretched in the longitudinal direction from an original heat stable form to a dimensionally heat unstable form capable of moving in the direction of its original form by the application of heat alone. A hold-down adhesive is applied to one side of the sheet across a transverse zone adjacent one of its ends, this zone being spaced from the other end of the sheet by a distance greater than the girth of the article to be covered. The sheet is wrapped around the article by laying the sheet against the article and overlapping the end portions so as to bond the adhesive-covered zone against the opposite side of the other end portion while leaving an adhesive-free zone at the interface between the overlapping end portions. Heat is applied externally to the overlapping end portions sufficient to effect a fusion bond therebetween at the adhesive-free interface, and thereafter the material is heated so as to shrink the sheet into close fitting relation with the article.

The fusion bond may be effected initially over the whole of the adhesive-free interface to produce the continuous tubular sleeve. However, in many applications the fusion bond may be effected initially at a restricted portion of the adhesive-free interface for maintaining the overlap during the further heating step, the fusion bond being subsequently completed over the whole of said interface.

During the further heating step in which the sheet is shrunk onto the article, large hoop stresses are set up in the material. However, the fusion bond between the two end portions is in the nature of a weld having a very high shear strength comparable with the inherent strength of the material of the sheet, and so there is no tendency for the sleeve to fail because of slippage or creep at the interface. Any failure of the sleeve will be due to an inherent weakness in the material itself, as in the case of a conventional tubular sleeve.

In a variant of the method, which is applicable to the covering of large diameter pipes, for example, the covering is formed not by a single sheet wrapped around the article as described above, but by a plurality of such sheets which are wrapped around the article in consecutive overlapping relation, the overlapping end portions thereof being bonded in pairs while leaving an adhesive-free region at each interface therebetween. Heat is applied externally to the pairs of overlapping end portions sufficient to effect a fusion bond at the adhesive-free region at each interface, and the material is further heated to shrink the covering so formed into close fitting relation with the article.

According to another aspect of the present invention, a heat shrinkable protective covering which is adapted to be applied to an article in wrapping relation thereto comprises a dimensionally heat unstable material in flexible sheet form having longitudinally spaced end portions capable of being brought into overlapping relation when the sheet is applied to the article, the material having been stretched in the longitudinal direction from an original heat stable form to a dimensionally heat unstable form capable of moving in the direction of its original form by the application of heat alone, one side of the sheet having a covering of a hold-down adhesive across a transverse zone adjacent one of its ends leaving an adhesive-free adjacent zone which is capable of being fusion bonded to the other side of the sheet when brought into overlapping relation with the other end portion.

Advantageously, the side of the sheet laid against the article is lined with a functional coating leaving an exposed zone at which the fusion bond is effected. The coating may be, for example, a sealant, an adhesive material, a mastic, a grease, or a two-component curable composition. In the case in which the coating is an adhesive, this holds the covering more firmly on the article and reduces any tendency for the covering to become dislodged from the article if the covering is damaged. Mastics, when employed, can function as a sealant to effect a seal between the covering and the article. Examples of greases which may be employed include water-repellent greases such as silicone greases. These can be particularly useful when forming an insulating covering around telephone cables or electrical splices. Examples of two-component curable compositions which may be employed include heat-curable epoxy or urethane compositions which can form a corrosion-protective layer over the surface of a pipe to which the covering is applied.

Examples of suitable sealants include hot-melt adhesives. Hot-melt adhesives for this purpose are well known in the art. However, as will be apparent to those skilled in the art, many fluid materials, which may be organic or inorganic and which may or may not be crystalline at ambient temperature and are rendered substantially non-crystalline on heat application can be used as the sealant. The important requirement, where adhesive sealant is used, is that it should be capable of flowing during the further heating step so as to allow unrestrained recovery of the sheet and to fill any voids and effect a seal between the surface of the article and the covering as the latter shrinks.

The material of the covering is preferably a heat recoverable polymeric material. For example, the material may be a polyolefin, a blend of polyolefins, or a blend of a polyolefin with an olefin copolymer, or with an elastomer, or with a mixture of these. Materials most commonly used as heat recoverable polymeric material include but are not limited to polyolefins, saturated and unsaturated polyesters e.g. polyethylene terephthalate, copolymers of ethylene, propylene and butene-1 and polyvinyl halides, etc. Other polymeric materials which may be useful are elastomers such as chlorosulfonated polyethylene (e.g. the material available under the trade mark HYPALON from Dupont Chemical Co.) polymerised fluorocarbons (e.g. the material available under the trade mark VITON from Dupont Chemical Co.), polysiloxanes, isopreneisobutylene copolymers, butadiene-acrylonitrile copolymers, butadiene-styrene copolymers, polychloroprene, polybutadiene, polyisoprene, natural rubber, plasticised polyvinyl chloride, polybutene, polyurethanes, ethylenepropylene rubbers (EPDM), polyurethanes, etc., or blends of selected elastomers with polyolefins. The most preferred polymeric materials are the polyolefins, e.g. polyethylenes, polypropylenes, various copolymers of ethylene and propylene, for example ethyleneethylacrylate or ethylene-vinyl acetate copolymers in which repeat units derived from ethylene comonomer predominate (e.g. about 80% to 97%), and blends of such copolymers with polyethylene.

The polymeric material may be crosslinked, and in the case of a polyolefin material it is preferably crosslinked to a degree of 25% to 80%, more preferably in the range 45% to 70%. In this connection, the degree of crosslinking of a given plastics material is definable by reference to solvent extraction tests conducted under standardized conditions on samples of the plastics. At zero crosslinking a solvent for the plastics will totally dissolve the plastics material, while a material which suffers no weight loss in such tests is regarded as 100% crosslinked. Intermediate degrees of crosslinking are indicated by proportionately intermediate percentage weight losses.

The hold-down adhesive performs the function of holding down the overlap at the end portions of the sheet or sheets when applied to the article while the fusion bond is being effected. If the adhesive is pressure sensitive, the overlap is secured to the underlap merely by pressing the overlapping end portions together. When heat is first applied at the overlap, the shear-resistant adhesive prevents slippage at the interface as the material tends to shrink and also prevents the overlap from curling and peeling back during the initial heat application. The adhesive is preferably, but not necessarily, one which is resistant to shear. Suitable shear-resistant adhesives are well-known to those skilled in the art.

The preferred materials are iso-butylene polymers, such as polyisobutylene, polybutene, and butyl rubber. These polymers can be partially cured to increase the shearstrength paticularly at elevated temperatures. Other isobutylene polymers that are useful include halogenated butyl rubber, and other modified butyls for example terpolymers in which divinylbenzene is added to impart a cure (e.g. Polysar's XL-20 and XL-50) and filled, plasticised and partially cured masterbatch crumb (e.g. Columbian Carbon's Bucar 5214). An appropriate quantity and grade of poly-isobutylene (Vistanex) may also be used to impart a desired tack (pressure sensitive) property according to the formulation. Addition of fillers is useful in adjusting tack and the cohesive strength of the adhesive. The fillers suitable for the application include carbon black, mica, graphite, talc, asbestos, alumunium hydrate, clays, hydrated silicas, calcium silicates, silicate-aluminates, fine furnace and thermal blacks, magnesium carbonate, and calcium carbonate. The preferred fillers, however, are carbon blacks and talcs.

Also other adhesive materials can be useful for the hold-down application and these include those based on nitrile rubbers, styrene-butadiene rubbers, styrene-isoprene rubbers, neoprenes, polyurethanes, ethylene-vinyl acetate, acrylates, (e.g. ethylene-ethyl acrylate), silicones, poly-vinyl-acetate, epoxies, amino resins, animal and vegetable glues, polypropylene, amorphous polypropylenes and polyvinylacetals. These adhesives may be of the hot-melt type, contact cement type, lacquer type, thermosetting adhesive type, pressure sensitive adhesive type, crosslinked adhesives, or two component adhesives. Many variations of adhesive systems used are possible; for example, a pressure sensitive transfer tape with a thin polymeric liner sandwiched between two pressure sensitive adhesive films can be applied to the overlap end so that one adhesive film is bonded to overlap and the adhesive film on the other side can be adhered to the underlap (e.g. J-Tape, 266P and other tapes from Adchem Corp. U.S.A.).

The hold-down adhesive may also be a material which is not pressure sensitive at ambient temperatures but which develops pressure-sensitivity when heated. In such case, the adhesive-covered zone may be carefully heated to render the adhesive tacky and bond it to the underlap. The adhesive may be heated by applying heat directly to the adhesive material before applying the sheet or sheets to the article.

Typical thickness of the high-shear hold-down adhesive may be in the range from 0.001" to 0.200" depending on the type of adhesive system used. The preferred thickness range falls between 0.010" to 0.080" for the preferred butyl based adhesive. The width of the adhesive useful for the articles generally falls in the range of 0.100" to 4" or even greater. But for the common applications, the widths greater than 3" have been found to be unnecessary. The preferred width for the common application is between 0.500" to 2" for the preferred butyl based adhesive.

BRIEF DESCRIPTION OF THE DRAWINGS

Various embodiments of the present invention, as applied to protective coverings for pipes and the like, will now be described by way of example with reference to the accompanying drawings, in which.

DETAILED DESCRIPTION

Figure 1:
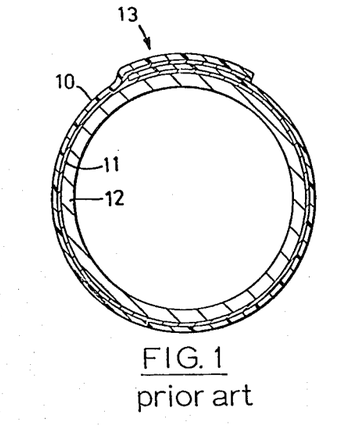
FIGS. 1 to 4 are cross-sectional views illustrating stages in the application of a known type of wrap-around sleeve to a pipe.
Figure 2:
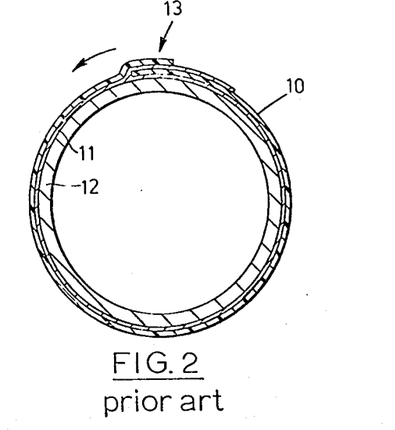
Figure 3:
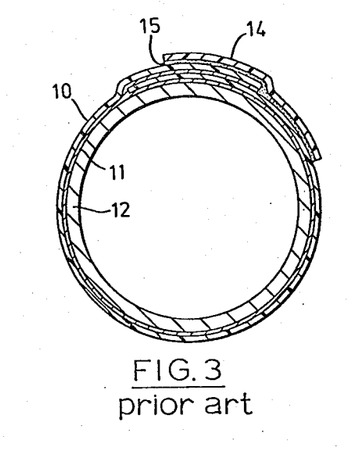
Figure 4:
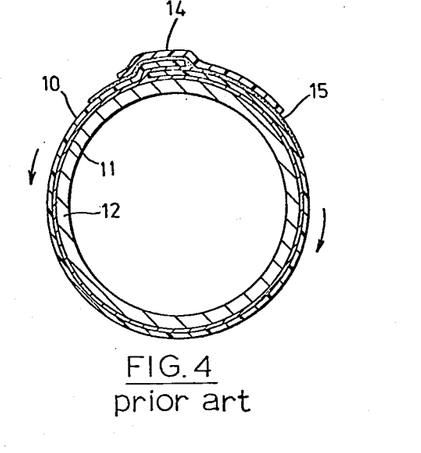

Referring to FIG. 1, a simple version of the common type of wrap-around sleeve presently in use comprises a rectangular sheet of flexible, heat shrinkable polymeric material 10, such as low density polyethylene, which is coated internally with a suitable hot-melt adhesive 11. This is wrapped around the pipe 12 as shown in FIG. 1, and is of such a length as to provide an overlap 13 of about 4" to 12". If the sleeve with such a simple overlap were to be shrunk by the application of heat to the material of the sleeve, the flow of melted adhesive would permit slippage to occur at the overlap and so there would be little tensile stress remaining in the recovered sleeve. In consequence, as is apparent from FIG. 2, there would be little tendency for the sleeve to force the internal adhesive sealant onto the pipe surface in order to fill up any surface irregularities or voids. Moreover, in the absence of any positive closure at the overlap, the sleeve would be liable to peel at the overlap and so the pipe covering would be ineffective. The most common method of reducing such slippage at the overlap is to apply closure patch 14 as illustrated in FIG. 3. The closure patch 14 is itself a strip of polymeric material serving as a backing sheet and having on one side a coating of adhesive 15. The adhesive 15 is normally an adhesive of the hot-melt type but having a high shear strength and a high melting point. Nevertheless, this adhesive must possess the property of being able to soften, and develop a tack so as to wet the outer surface of the sleeve, and also bond securely to the surface to resist the shrinking force of the sleeve. A difficulty here, however, is that a considerable amount of heat must be applied in the region of the overlap, owing to the number of layers of polymeric material involved, and this greater amount of heat at the overlap causes the high shear strength adhesive 15 on the closure patch to melt and so lose some of its shear strength. In consequence, slippage at the overlap can occur as the sleeve is shrunk, the effect being illustrated in FIG. 4. Various techniques have been developed for reducing the slippage at the overlap, for example by preheating the layers of material in the region, but these techniques are not wholly effective and are very time consuming.

The problem of slippage in the region of the overlap in conventional wrap-around sleeves not only makes such sleeves less effective substitutes for tubular sleeves, but also limits their application to pipe profiles which do not call for sleeves having a high contraction ratio. For example, conventional tubular sleeves typically have contraction ratios ranging from 1:1.05 to 1:1.5, that is a shrinkage of 5% to 50%. The greater the contraction ratio, the greater is the shrinking force in the sleeve when heat is applied. Conventional wrap-around sleeves commonly have contraction ratios of 1:1.10 to 1:1.35 and if these values are exceeded there is a substantial risk of sleeve failure due to excessive slippage at the overlap. Clearly, in pipes having large transitions or profiles, as in bell and spigot joints for example, conventional wrap-around sleeves would be largely ineffective.

Figure 5:
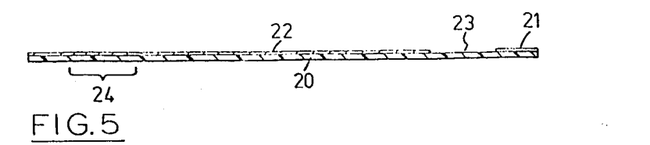
FIG. 5 is a longitudinal sectional view of a sleeve in accordance with the present invention.
Figure 6:
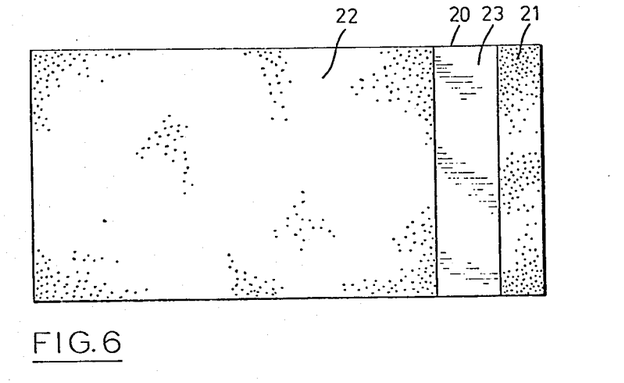
FIG. 6 is a top plan view of the sleeve shown in FIG. 5.

Referring now to FIGS. 5 and 6, a pipe covering in accordance with the present invention comprises basically a rectangular sheet of polymeric material 20, such as low density polyethylene, which has been stretched in the longitudinal direction from an original heat stable form to a dimensionally heat unstable form, from which it will tend to recover to its original form upon application of heat. A strip of hold-down adhesive 21 is applied across a transverse zone adjacent one end of the sheet 20. The adhesive is preferably a shear-resistant, pressure sensitive adhesive, and it may well be composed of a blend of isobutylene polymers, with fillers as previously mentioned. This strip of adhesive may take the form of an applied coating, or it may take the form of a double-sided adhesive transfer tape. In the preferred embodiment of the invention illustrated in the drawings, one side of the sheet 20, namely the side which is to be laid against the pipe, is lined with a functional coating 22, which is preferably a hot-melt adhesive or a mastic as in the case of a conventional wrap-around sleeve. In FIGS. 5 and 6 the coating 22 is shown to be on the same side as the adhesive strip 21, and extends from the opposite end of the sheet for a limited distance so as to leave a bare, adhesive-free zone 23 of the polymeric material.

Figures 7, 8:
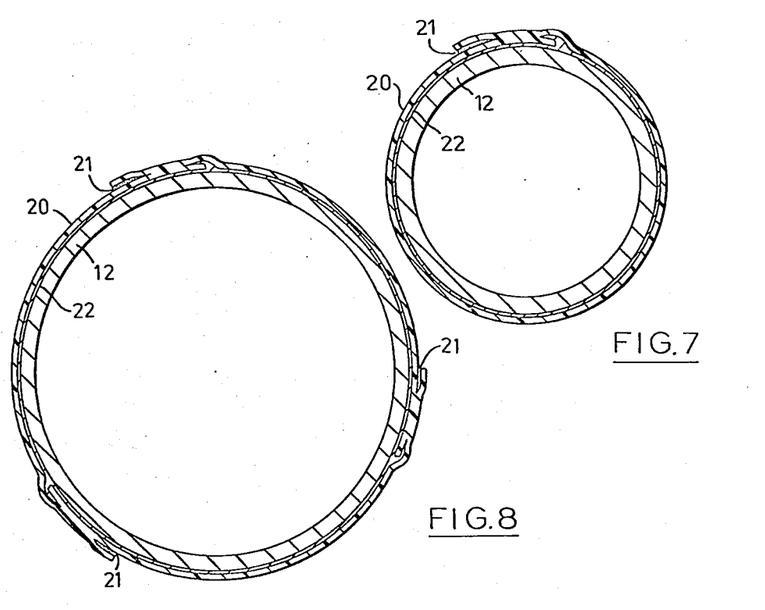
FIG. 7 shows in cross section the sleeve of the present invention as applied to a pipe.
FIG. 8 shows a composite covering in accordance with the present invention as applied to a pipe.

In order to apply this sleeve to a pipe to produce the continuous, seamless covering illustrated in FIG. 7, the sheet is first wrapped around the pipe by laying the adhesive sealant coated side against the pipe so as to overlap its end portions with the shear-resistant adhesive strip 21 overlapping the other end portion of the sheet while leaving an adhesive-free region at the interface between the overlapping end portions. With the sheet configuration shown in FIG. 5, this adhesive-free region of the interface is formed by the bare zone 23 which overlaps a bare zone 24 on the opposite side of the sheet. The overlapping end portions are then simply adhesively bonded together and then heat is applied externally to the overlapping end portions, preferably by means of a propane torch flame or the like, the heat being readily transferred to the interface at which each surface develops a tack causing an immediate high shear strength bond between the overlapping portions. Typically, a temperature of about 140° to 150° C. is required to effect this bond for low density polyethylene material. This fusion bond, which is in the nature of a weld having a strength comparable to that of the material itself, is formed by the partial melting and intermingling of the uncrosslinked constituents of the polymer at the interface. In the case of polyolefin sleeves, and polyethylene sleeves in particular, it is preferred that the materials be crosslinked to a degree of 25% to 80% and preferably to a degree of 45% to 70%. The fusion bond having been made so as to secure the overlap, the sheet is further heated so as to shrink it into close fitting relation with the pipe.

The fusion bond must clearly be strong enough to secure the overlap during the subsequent shrinking step, and in the case of pipes with large transitions, such as bell and spigot joints, it will generally be necessary to complete the fusion bond before shrinking the material of the sheet. However, with plain cylindrical pipes and pipes in which the transitions are not too large, it will be appropriate and more convenient in some cases to effect the fusion bond initially over a restricted portion of the adhesive-free interface, usually midway between the ends of the interface, so as to secure the overlap during the subsequent heating step. The fusion bond can thereafter be completed over the whole of the adhesive-free interface either during or after the subsequent shrinking of the sheet.

Referring now to FIG. 8, the illustrated pipe covering is actually a composite covering comprised of three sleeve elements of the type described with reference to FIGS. 5 and 6, the sleeve elements being wrapped around the pipe in consecutive overlapping relationship as illustrated in FIG. 8 and fusion bonded together as described above so as to form the composite covering which is heat shrunk onto the pipe.

Although in the embodiments of the invention described above the covering is lined with an adhesive sealant, which will be required in most applications, there are numerous applications in which the adhesive sealant will not be required. The present invention therefore encompasses the above described methods of applying such coverings which do not have an adhesive sealant lining. It should also be noted that the coating or strip of shear-resistant adhesive applied to an end zone of the covering sheet may alternatively be applied in the field during application of the covering to the article to be covered.

In order to test the effectiveness of the method of the invention, comparative tests have been made on specimens prepared to simulate the overlap conditions in various types of wrap-around sleeve. The types of sleeve represented in the tests include the following commercially available sleeves:

Nitto Neo Cover RW-Wrap 30, manufactured by Nitto Denko America Inc. and referred to herein as "NITTO";

Raychem WPC Thermofit pipe sleeve, manufactured by Raychem Corporation and referred to herein as "RAYCHEM";

Canusa LPW, manufactured by Canusa Coating Systems Ltd., and referred to herein as "CANUSA", all being wrap-around sleeves with closure patch. The same tests were performed on specimens prepared to simulate the coverings of the present invention, referred to herein as "W/A TUBULAR".

Tests were conducted on the above sleeves to determine the maximum temperatures reached when applying the sleeves. A digital pyrometer probe was inserted under the patch during application and typical temperatures were recorded:

| | |
|---|---|
| NITTO: | 150–160° C. |
| RAYCHEM: | 165–175° C. |
| CANUSA: | 140–150° C. |
| W/A TUBULAR: | 140–150° C. |

The lap bond formed by these sleeves must be stable at these temperatures in order to be comparable to the performance of the conventional seamless tubular sleeve. The tests were conducted on the recovered sleeve polymeric sheets to determine the tensile strengths at certain extensions. The specimen 3"×½" was clamped in the jaws of an Instron Tensile Testing Machine in controlled temperature environmental chamber and was stretched. The maximum load in pounds reached was recorded. The test conditions were as follows:

Specimen size: 3"×½"
Speciman cut from actual recovered sleeve
Test temperatures: 23° C., 142° C., 175° C.
Test speed: 0.2"/min.

The results are recorded on Table 1.

TABLE 1

SLEEVE SHEET STRENGTH

| | Test Temp | | |
|---|---|---|---|
| Sleeve Type | 23° C. | 142° C. | 175° C. |
| Sleeve Strength at 2" Extension (66% Stretch) | | | |
| Nitto | 35 lb. | 0.38 lb. | 0.31 lb. |
| Raychem | 25 lb. | 0.48 lb. | 0.54 lb. |
| Canusa | 23.5 lb. | 0.23 lb. | 0.22 lb. |
| W/A Tubular | 23.5 lb. | 0.23 lb. | 0.22 lb. |
| Sleeve Strength at 4" Extension (133% Stretch) | | | |
| Nitto | 36 lb. | 0.50 lb. | 0.50 lb. |
| Raychem | 28.5 lb. | 0.88 lb. | 0.93 lb. |
| Canusa | 27.0 lb. | 0.34 lb. | 0.34 lb. |
| W/A Tubular | 27.0 lb. | 0.34 lb. | 0.34 lb. |

The specimens for lap shear strength testing were made to simulate the overlap conditions of the sleeve types. For the conventional wrap-around sleeves (CANUSA, NITTO, RAYCHEM) the sleeve polymeric sheet and the closure patch were cut into strips of 3"×½" and were lapped together to form a 2"×½" overlap. The LPW-BUTYL-LPW was also prepared, the butyl being sandwiched between the sleeve LPW sheets. The specimen for a W/A TUBULAR sleeve was prepared, one lap being simply placed on the other and heat being applied. In the above and in the accompanying tables, "LPW" denotes the polymeric material of the W/A TUBULAR sleeve, this being a blend of low density polyethylene with ethylene-ethyl acrylate copolymer, and "BUTYL" denotes the shear-resistant adhesive, this being an isobutylene polymer adhesive used in the W/A TUBULAR sleeve.

The specimens were prepared under controlled conditions of temperature and presssure to evaluate the effect of temperature and presssure on the lap bond. The specimens were prepared at 150° C. and 200° C. and under zero pressure (i.e. overlap was simply laid on the underlap) and 0.75 p.s.i. pressure (i.e. a load of 0.75 lb. placed on the 2"×½" overlap) for 3 minutes and then cooled to room temperature.

The specimens were conditioned for 24 hours at room temperature and then tested on the Instron Tensile Testing Machine. Each specimen was clamped in the jaws of the machine in the environmental chamber and extended at controlled speed at the test temperature. The chart recorder on the machine recorded the load as a function of extension. The samples were extended by 4" or to failure whichever was earlier. Since the lap length was only 2", an extension of 2" to 2.5" should cause failure if a complete shear at the lap occurred. The 4" extension was the maximum possible as the environmental chamber limited the jaw movement. The test conditions were as follows:

Specimen lap size: 2"×½"
Distance between clamps: 3"
Test speed: 0.2"/min.
Test temperature: 142° C. and 175° C.

All the results are tabulated in Tables 2 to 9, in which
"LPW-LPW" denotes the fusion bond of the overlap on the W/A TUBULAR sleeve, and
"LPW-BUTYL-LPW" denotes the lap formed by the shear-resistant hold-down adhesive at the end of the W/A TUBULAR sleeve.

TABLE 2

WRAPAROUND TUBULAR SLEEVE LAP SHEAR STRENGTH
(1) Effect of Sample Preparation Temperature
(a) at 0 p.s.i. Prep Force
142° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW (W/A Tubular) | 0 | 150 | 142 | 0.41 | 4 |
|   |   | 0 | 200 | 142 | 0.35 | 4 |
| 2. | LPW-BUTYL-LPW | 0 | 150 | 142 | 0.44 | 4 |
|   |   | 0 | 200 | 142 | 0.47 | 4 |
| 3. | NITTO: SLEEVE-PATCH | 0 | 150 | 142 | 0.20 | 0.9 |
|   |   | 0 | 200 | 142 | 0.30 | 1.2 |
| 4. | RAYCHEM: SLEEVE-PATCH | 0 | 150 | 142 | 0.53 | 1.5 |
|   |   | 0 | 200 | 142 | 0.62 | 1.6 |
| 5. | CANUSA: SLEEVE-PATCH | 0 | 150 | 142 | 0.05 | 0.3 |
|   |   | 0 | 200 | 142 | 0.05 | 0.2 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW (W/A Tubular) | 4 ml | 0.23 | 0.34 | 0 shear at interface: Lap strength > shear strength ∴ no shear. |
|   |   | 4 ml | 0.23 | 0.34 | 0 shear at interface: Lap strength > shear strength ∴ no shear. |
| 2. | LPW-BUTYL-LPW | 4 ml | 0.23 | 0.34 | 0 shear at interface: Lap strength > shear strength ∴ no shear. |
|   |   | 4 ml | 0.23 | 0.34 | 0 shear at interface: Lap strength > shear strength ∴ no shear. |
| 3. | NITTO: SLEEVE-PATCH | 2.0 fail | 0.38 | 0.50 | Complete shear - cohesive failure. |
|   |   | 2.5 fail | 0.38 | Complete shear - | cohesive failure. |
| 4. | RAYCHEM: SLEEVE-PATCH | 2.5 fail | 0.48 | 0.88 | Complete shear - cohesive and adhesive failure. |
|   |   | 2.4 fail | 0.48 | 0.88 | Complete shear - cohesive and adhesive failure. |
| 5. | CANUSA: SLEEVE-PATCH | 2.1 fail | 0.23 | 0.34 | Complete shear - cohesive failure. |
|   |   | 2.0 fail | 0.23 | 0.34 | Complete shear - cohesive failure. |

TABLE 3

WRAPAROUND TUBULAR SLEEVE LAP SHEAR STRENGTH
(1) Effect of Sample Preparation Temperature
(b) at 0.75 p.s.i. Prep Force
142° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW | 0.75 | 150 | 142 | 0.43 | 4 |

TABLE 3-continued

WRAPAROUND TUBULAR SLEEVE LAP SHEAR STRENGTH
(1) Effect of Sample Preparation Temperature
(b) at 0.75 p.s.i. Prep Force
142° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW (W/A Tubular) | 0.75 | 200 | 142 | 0.36 | 4 |
| 2. | LPW-BUTYL-LPW | 0.75 | 150 | 142 | 0.47 | 4 |
|    |                | 0.75 | 200 | 142 | 0.46 | 4 |
| 3. | NITTO: SLEEVE-PATCH | 0.75 | 150 | 142 | 0.35 | 1.6 |
|    |                     | 0.75 | 200 | 142 | 0.41 | 1.3 |
| 4. | RAYCHEM: SLEEVE-PATCH | 0.75 | 150 | 142 | 0.65 | 1.4 |
|    |                       | 0.75 | 200 | 142 | 0.73 | 2.0 |
| 5. | CANUSA: SLEEVE-PATCH | 0.75 | 150 | 142 | 0.03 | 0.3 |
|    |                      | 0.75 | 200 | 142 | 0.04 | 0.2 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW (W/A Tubular) | 4 ml | 0.23 | 0.34 | 0 shear at lap. lap strength > sleeve strength ∴ no shear. |
|    |                        | 4 ml | 0.23 | 0.34 | 0 shear at lap. lap strength > sleeve strength ∴ no shear. |
| 2. | LPW-BUTYL-LPW | 4 ml | 0.23 | 0.34 | 0 shear at lap. lap strength > sleeve strength ∴ no shear. |
|    |                | 4 ml | 0.23 | 0.34 | 0 shear at lap. lap strength > sleeve strength ∴ no shear. |
| 3. | NITTO: SLEEVE-PATCH | 2.8 fail | 0.38 | 0.5 | Complete shear - cohesive failure. |
|    |                     | 3.0 fail | 0.38 | 0.5 | Complete shear - cohesive failure. |
| 4. | RAYCHEM: SLEEVE-PATCH | 1.9 fail | 0.48 | 0.88 | Complete shear - cohesive and adhesive failure |
|    |                       | 2.4 fail | 0.48 | 0.88 | Complete shear - cohesive and adhesive failure |
| 5. | CANUSA: SLEEVE-PATCH | 2.0 fail | 0.23 | 0.34 | Complete shear - cohesive failure. |
|    |                      | 2.0 fail | 0.23 | 0.34 | Complete shear - cohesive failure. |

TABLE 4

WRAPAROUND TUBULAR SLEEVE LAP SHEAR STRENGTH
(2) Effect of Sample Preparation Force
(a) at 150° C. Prep Temp
142° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW (W/A Tubular) | 0 | 150 | 142 | 0.41 | 4 |
|    |                        | 0.75 | 150 | 142 | 0.43 | 4 |
| 2. | LPW-BUTYL-LPW | 0 | 150 | 142 | 0.44 | 4 |
|    |                | 0.75 | 150 | 142 | 0.47 | 4 |
| 3. | NITTO: SLEEVE-PATCH | 0 | 150 | 142 | 0.20 | 0.9 |
|    |                     | 0.75 | 150 | 142 | 0.35 | 1.6 |
| 4. | RAYCHEM: SLEEVE-PATCH | 0 | 150 | 142 | 0.53 | 1.5 |
|    |                       | 0.75 | 150 | 142 | 0.65 | 1.4 |
| 5. | CANUSA: SLEEVE-PATCH | 0 | 150 | 142 | 0.05 | 0.3 |
|    |                      | 0.75 | 150 | 142 | 0.03 | 0.3 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW (W/A Tubular) | 4 ml | 0.23 | 0.34 | 0 shear at lap. Lap strength > sleeve strength ∴ no shear. |
|    |                        | 4 ml | 0.23 | 0.34 | 0 shear at lap. Lap strength > sleeve |

TABLE 4-continued
WRAPAROUND TUBULAR SLEEVE LAP SHEAR STRENGTH
(2) Effect of Sample Preparation Force
(a) at 150° C. Prep Temp
142° C. Test Temp

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 2. | LPW-BUTYL-LPW | 4 ml | 0.23 | 0.34 | strength ∴ no shear. 0 shear at lap. Lap strength > sleeve strength 44 no shear. |
|  |  | 4 ml | 0.23 | 0.34 | 0 shear at lap. Lap strength > sleeve strength ∴ no shear. |
| 3. | NITTO: SLEEVE-PATCH | 2.0 fail | 0.38 | 0.5 | Complete shear - cohesive failure. |
|  |  | 2.8 fail | 0.38 | 0.5 | Complete shear - cohesive failure. |
| 4. | RAYCHEM: SLEEVE-PATCH | 2.5 fail | 0.48 | 0.88 | Complete shear - cohesive and adhesive failure. |
|  |  | 1.9 fail | 0.48 | 0.88 | Complete shear - cohesive and adhesive failure. |
| 5. | CANUSA: SLEEVE-PATCH | 2.1 fail | 0.23 | 0.34 | Complete shear - cohesive failure. |
|  |  | 2.0 fail | 0.23 | 0.34 | Complete shear - cohesive failure. |

TABLE 5
WRAPAROUND TUBULAR SLEEVE LAP SHEAR STRENGTH
(2) Effect of Sample Preparation Force
(b) at 200° C. Prep Temp
142° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW (W/A Tubular) | 0 | 200 | 142 | 0.35 | 4 |
|  |  | 0.75 | 200 | 142 | 0.36 | 4 |
| 2. | LPW-BUTYL-LPW | 0 | 200 | 142 | 0.47 | 4 |
|  |  | 0.75 | 200 | 142 | 0.46 | 4 |
| 3. | NITTO: SLEEVE-PATCH | 0 | 200 | 142 | 0.30 | 1.2 |
|  |  | 0.75 | 200 | 142 | 0.41 | 1.3 |
| 4. | RAYCHEM: SLEEVE-PATCH | 0 | 200 | 142 | 0.62 | 1.6 |
|  |  | 0.75 | 200 | 142 | 0.73 | 2.0 |
| 5. | CANUSA: SLEEVE-PATCH | 0 | 200 | 142 | 0.05 | 0.3 |
|  |  | 0.75 | 200 | 142 | 0.04 | 0.2 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW (W/A Tubular) | 4 ml | 0.23 | 0.34 | 0 shear at lap. Lap strength > sleeve strength ∴ no shear. |
|  |  | 4 ml | 0.23 | 0.34 | 0 shear at lap. Lap strength > sleeve strength ∴ no shear. |
| 2. | LPW-BUTYL-LPW | 4 ml | 0.23 | 0.34 | 0 shear at lap. Lap strength > sleeve stength ∴ no shear. |
|  |  | 4 ml | 0.23 | 0.34 | 0 shear at lap. Lap strength > sleeve strength ∴ no shear. |
| 3. | NITTO: SLEEVE-PATCH | 2.5 ml | 0.38 | 0.5 | Complete shear - cohesive failure. |
|  |  | 3.0 fail | 0.38 | 0.5 | Complete shear - cohesive failure. |
| 4. | RAYCHEM: SLEEVE-PATCH | 2.4 fail | 0.48 | 0.88 | Complete shear - cohesive and adhesive failure. |
|  |  | 2.4 fail | 0.48 | 0.88 | Complete shear - cohesive and adhesive failure. |
| 5. | CANUSA: SLEEVE-PATCH | 2.1 fail | 0.23 | 0.34 | Complete shear - cohesive failure. |
|  |  | 2.0 fail | 0.23 | 0.34 | Complete shear - |

TABLE 5-continued

WRAPAROUND TUBULAR SLEEVE LAP SHEAR STRENGTH
(2) Effect of Sample Preparation Force
(b) at 200° C. Prep Temp
142° C. Test Temp cohesive failure.

TABLE 6

WRAPAROUND TUBULAR SLEEVE LAP SHEAR STRENGTH
(2) Effect of Sample Preparation Force
(c) at 150° C. Prep Temp
175° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW (W/A Tubular) | 0 | 150 | 175 | 0.38 | 4 |
|  |  | 0.75 | 150 | 175 | 0.42 | 4 |
| 2. | LPW-BUTYL-LPW | 0 | 150 | 175 | 0.53 | 4 |
|  |  | 0.75 | 150 | 175 | 0.45 | 4 |
| 3. | NITTO: SLEEVE-PATCH | 0 | 150 | 175 | — | — |
|  |  | 0.75 | 150 | 175 | 0.28 | 1.5 |
| 4. | RAYCHEM: SLEEVE-PATCH | 0 | 150 | 175 | 0.53 | 1.25 |
|  |  | 0.75 | 150 | 175 | 0.52 | 1.4 |
| 5. | CANUSA: SLEEVE-PATCH | 0 | 150 | 175 | 0.01 | 0.2 |
|  |  | 0.75 | 150 | 175 | 0.03 | 0.2 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW (W/A Tubular) | 4 ml | 0.22 | 0.34 | 0 shear Lap strength > sleeve strength. |
|  |  | 4 ml | 0.22 | 0.34 | 0 shear Lap strength > sleeve strength. |
| 2. | LPW-BUTYL-LPW | 4 ml | 0.22 | 0.34 | 0 shear Lap strength > sleeve strength. |
|  |  | 4 ml | 0.22 | 0.34 | 0 shear Lap strength > sleeve strength. |
| 3. | NITTO: SLEEVE-PATCH | — | — | — | No sample available. |
|  |  | 2.7 fail | 0.31 | 0.5 | Complete shear, cohesive failure. |
| 4. | RAYCHEM: SLEEVE-PATCH | 2.3 fail | 0.54 | 0.93 | Complete shear, cohesive failure. |
|  |  | 1.9 fail | 0.54 | 0.93 | Complete shear, cohesive failure. |
| 5. | CANUSA: SLEEVE-PATCH | 2.0 fail | 0.22 | 0.34 | Complete shear, cohesive failure. |
|  |  | 1.7 fail | 0.22 | 0.34 | Complete shear, cohesive failure. |

TABLE 7

WRAPAROUND TUBULAR SLEEVE LAP SHEAR STRENGTH
(2) Effect of Sample Preparation Force
(d) at 150° C. Prep Temp
23° C. Test Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW (W/A Tubular) | 0 | 150 | 23 | 26.5 | 4 |
|  |  | 0.75 | 150 | 23 | 28.75 | 4 |
| 2. | LPW-BUTYL-LPW | 0 | 150 | 23 | 23.5 | 0.3 |
|  |  | 0.75 | 150 | 23 | 23.5 | 0.4 |
| 3. | NITTO: SLEEVE-PATCH | 0 | 150 | 23 | 30.0 | 0.4 |
|  |  | 0.75 | 150 | 23 | 34.5 | 0.5 |
| 4. | RAYCHEM: | 0 | 150 | 23 | 35.7 | 0.3 |

TABLE 7-continued

WRAPAROUND TUBULAR SLEEVE LAP SHEAR STRENGTH
(2) Effect of Sample Preparation Force
(d) at 150° C. Prep Temp
23° C. Test Temp

|     | SLEEVE-PATCH | 0.75 | 150 | 23 | 41.5 | 4 |
|-----|--------------|------|-----|----|------|---|
| 5.  | CANUSA:      | 0    | 150 | 23 | 20.5 | 4 |
|     | SLEEVE-PATCH | 0.75 | 150 | 23 | 16.5 | 4 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|-----|--------|------|------|------|----------|
| 1. | LPW-LPW | 4 ml | 23.5 | 27.0 | 0 shear, no failure |
|    | (W/A Tubular) | 4 ml | 23.5 | 27.0 | 0 shear, no failure |
| 2. | LPW-BUTYL-LPW | 1.5 fail | 23.5 | 27.0 | Complete shear, cohesive failure. |
|    |               | 2.0 fail | 23.5 | 27.0 | Complete shear, cohesive failure. |
| 3. | NITTO: SLEEVE-PATCH | 1.0 fail | 35.0 | 36.0 | Complete - cohesive and adhesive failure. |
|    |                     | 1.3 fail | 35.0 | 36.0 | Complete - cohesive and adhesive failure. |
| 4. | RAYCHEM: SLEEVE-PATCH | 0.35 fail | 25.0 | 28.5 | Complete failure - adhesive to backing. |
|    |                       | 4 ml | 25.0 | 28.5 | No shear, Lap strength > sleeve strength |
| 5. | CANUSA: SLEEVE-PATCH | 4 ml | 23.5 | 27.0 | No shear, Lap strength > sleeve strength |
|    |                      | 4 ml | 23.5 | 27.0 | No shear, Lap strength > sleeve strength |

TABLE 8

WRAPAROUND TUBULAR SLEEVE LAP SHEAR STRENGTH
(3) Effect of Test Temperature
(a) at 0 p.s.i. Prep Force
150° C. Prep Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|-----|--------|------|------|------|------|------|
| 1. | LPW-LPW | 0 | 150 | 142 | 0.41 | 4 |
|    | (W/A Tubular) | 0 | 150 | 175 | 0.38 | 4 |
| 2. | LPW-BUTYL-LPW | 0 | 150 | 142 | 0.44 | 4 |
|    |               | 0 | 150 | 175 | 0.53 | 4 |
| 3. | NITTO: SLEEVE-PATCH | 0 | 150 | 142 | 0.2 | 0.9 |
|    |                     | 0 | 150 | 175 | — | — |
| 4. | RAYCHEM: SLEEVE-PATCH | 0 | 150 | 142 | 0.53 | 1.5 |
|    |                       | 0 | 150 | 175 | 0.53 | 1.25 |
| 5. | CANUSA: SLEEVE-PATCH | 0 | 150 | 142 | 0.05 | 0.3 |
|    |                      | 0 | 150 | 175 | 0.01 | 0.2 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|-----|--------|------|------|------|----------|
| 1. | LPW-LPW (W/A Tubular) | 4 ml | 0.23 | 0.34 | 0 shear, Lap strength > sleeve strength. |
|    |                       | 4 ml | 0.22 | 0.34 | 0 shear, Lap strength > sleeve strength. |
| 2. | LPW-BUTYL-LPW | 4 ml | 0.23 | 0.34 | 0 shear, Lap strength > sleeve strength. |
|    |               | 4 ml | 0.22 | 0.34 | 0 shear, Lap strength > sleeve strength. |
| 3. | NITTO: SLEEVE-PATCH | 2.0 fail | 0.38 | 0.50 | Complete shear - cohesive failure. |
|    |                     | — | — | — | No sample available. |
| 4. | RAYCHEM: | 2.5 fail | 0.48 | 0.88 | Complete shear - |

TABLE 8-continued
WRAPAROUND TUBULAR SLEEVE LAP SHEAR STRENGTH
(3) Effect of Test Temperature
(a) at 0 p.s.i. Prep Force
150° C. Prep Temp

|   |   |   |   |   |   |
|---|---|---|---|---|---|
|   | SLEEVE-PATCH |   |   |   | cohesive failure. |
|   |   | 2.3 fail | 0.54 | 0.93 | Complete shear - cohesive failure. |
| 5. | CANUSA: SLEEVE-PATCH | 2.1 fail | 0.23 | 0.34 | Complete shear - cohesive failure. |
|   |   | 2.0 fail | 0.22 | 0.34 | Complete shear - cohesive failure. |

TABLE 9
WRAPAROUND TUBULAR SLEEVE LAP SHEAR STRENGTH
(3) Effect of Test Temperature
(b) at 0.75 p.s.i. Prep Force
150° C. Prep Temp

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | LPW-LPW | 0.75 | 150 | 142 | 0.43 | 4.0 |
|    | (W/A Tubular) | 0.75 | 150 | 175 | 0.42 | 4.0 |
| 2. | LPW-BUTYL-LPW | 0.75 | 150 | 142 | 0.47 | 4 |
|    |   | 0.75 | 150 | 175 | 0.45 | 4 |
| 3. | NITTO: SLEEVE-PATCH | 0.75 | 150 | 142 | 0.35 | 1.6 |
|    |   | 0.75 | 150 | 175 | 0.28 | 1.5 |
| 4. | RAYCHEM: SLEEVE-PATCH | 0.75 | 150 | 142 | 0.65 | 1.4 |
|    |   | 0.75 | 150 | 175 | 0.52 | 1.4 |
| 5. | CANUSA: SLEEVE-PATCH | 0.75 | 150 | 142 | 0.03 | 0.3 |
|    |   | 0.75 | 150 | 175 | 0.02 | 0.2 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW | 4 ml | 0.23 | 0.34 | 0 shear, no failure. |
|    | (W/A Tubular) | 4 ml | 0.22 | 0.34 | 0 shear, no failure. |
| 2. | LPW-BUTYL-LPW | 4 ml | 0.23 | 0.34 | 0 shear, Lap strength > sleeve strength. |
|    |   | 4 ml | 0.22 | 0.34 | 0 shear, Lap strength > sleeve strength. |
| 3. | NITTO: SLEEVE-PATCH | 2.8 fail | 0.38 | 0.5 | Complete shear - cohesive failure. |
|    |   | 2.7 fail | 0.31 | 0.50 | Complete shear - cohesive failure. |
| 4. | RAYCHEM: SLEEVE-PATCH | 1.9 fail | 0.48 | 0.88 | Complete shear, cohesive and adhesive failure. |
|    |   | 1.9 fail | 0.54 | 0.93 | Complete shear, cohesive failure. |
| 5. | CANUSA: SLEEVE-PATCH | 2.0 fail | 0.23 | 0.34 | Complete shear, cohesive failure. |
|    |   | 1.7 fail | 0.22 | 0.34 | Complete shear, cohesive failure. |

Tests were conducted to evaluate the stability of the lap bond after being subjected to extreme temperature cycles. The lap shear test specimens were immersed in boiling water for 72 hours, and then removed and immediately placed in a freezer at −50° C. At the end of 2 hours they were removed and conditioned at room temperature for 24 hours before testing for lap shear strength. The results are tabulated in Table 10.

TABLE 10
WRAPAROUND TUBULAR SLEEVE LAP SHEAR STRENGTH
Boil-Freeze Test
Samples boiled in water for 72 h
then placed in freezer for 2 h @ −50° C.

| PREP. | PREP. | TEST | LAP SHEAR | EXT. AT LAP SHEAR |
|---|---|---|---|---|

TABLE 10-continued

WRAPAROUND TUBULAR SLEEVE LAP SHEAR STRENGTH
Boil-Freeze Test
Samples boiled in water for 72 h
then placed in freezer for 2 h @ −50° C.

| NO. | SAMPLE | FORCE p.s.i. | TEMP. °C. | TEMP. °C. | STRENGTH lb. | STRENGTH in. |
|---|---|---|---|---|---|---|
| 1. | LPW-LPW (W/A Tubular) | 0.75 | 150 | 23 | 25.0 | 4.0 |
|    |                       | 0.75 | 150 | 142 | 0.45 | 4.0 |
| 2. | LPW-BUTYL-LPW | 0.75 | 150 | 23 | 21.5 | 2.1 |
|    |               | 0.75 | 150 | 142 | 0.23 | 1.5 |
| 3. | NITTO: SLEEVE-PATCH | 0.75 | 150 | 23 | | |
|    |                     | 0.75 | 150 | 142 | | |
| 4. | RAYCHEM: SLEEVE-PATCH | 0.75 | 150 | 23 | 40.5 | 4.0 |
|    |                       | 0.75 | 150 | 142 | 0.51 | 0.25 |
| 5. | CANUSA: SLEEVE-PATCH | 0.75 | 150 | 23 | 19.0 | 4.0 |
|    |                      | 0.75 | 150 | 142 | 0.05 | 0.4 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | LPW-LPW (W/A Tubular) | 4 ml | 21.5 | 24.5 | 0 shear, no failure. |
|    |                       | 4 ml | 0.2 | 0.3 | 0 shear, no failure. |
| 2. | LPW-BUTYL-LPW | 2.1 fail | 21.5 | 24.5 | Lap shears off - cohesive failure |
|    |               | 1.5 fail | 0.2 | 0.3 | Adhesive failure - Butyl lifts off. |
| 3. | NITTO: SLEEVE-PATCH | | | | Sample not available. |
| 4. | RAYCHEM: SLEEVE-PATCH | 4 ml | 23.5 | 25.0 | No shear - sleeve stretching. |
|    |                       | 0.6 fail | 0.40 | 0.79 | ¼" shear & then disbonds completely cohesively |
| 5. | CANUSA: SLEEVE-PATCH | 4 ml | 21.5 | 24.5 | No shear, patch stretching. |
|    |                      | 2.0 fail | 0.2 | 0.3 | Complete shear - cohesive failure. |

In order to observe the effect of percentage crosslinking on the fusion bond and on the shrink characteristics of the sleeve, the LPW sleeve polymeric sheet was crosslinked using ionising electron radiation to different levels of crosslinking. Lap shear specimens were prepared from these samples under the same conditions and then tested for lap shear strength. The purpose of these tests was to evaluate the effect of crosslinking on the fusion bond, and to determine the optimum crosslinking for the material of the sheet. The results are tabulated in Table 11.

TABLE 11

WRAPAROUND TUBULAR SLEEVE LAP SHEAR STRENGTH
April 12, 1982
Effect of % Cross-link on Fusion Bond
Sample: LPW-LPW

| NO. | SAMPLE | PREP. FORCE p.s.i. | PREP. TEMP. °C. | TEST TEMP. °C. | LAP SHEAR STRENGTH lb. | EXT. AT LAP SHEAR STRENGTH in. |
|---|---|---|---|---|---|---|
| 1. | 70% | 0 | 150 | 142 | 0.35 | 3.2 |
| 2. | 65% | 0 | 150 | 142 | 0.4 | 4 |
| 3. | 60% | 0 | 150 | 142 | 0.22 | 4 |
| 4. | 50% | 0 | 150 | 142 | 0.15 | 4 |
| 5. | 45% | 0 | 150 | 142 | 0.1 | 4 |

| NO. | SAMPLE | EXT. AT FAILURE OR MACH. LIMIT (ML) in. | SLEEVE STRENGTH @ 2" EXT. lb. | SLEEVE STRENGTH @ 4" EXT. lb. | COMMENTS |
|---|---|---|---|---|---|
| 1. | 70% | 3.2 | | | No shear, lap disbonds |
| 2. | 65% | 4 | | | No shear |
| 3. | 60% | 4 | | | No shear |
| 4. | 50% | 4 | | | No shear |
| 5. | 45% | 4 | | | No shear |

Since the percentage crosslinking also affects the shrinking force, and therefore the shrinking characteristics of the sleeve, sleeves were prepared from these LPW materials with different degrees of crosslinking, and applied to profiled pipe. This test indicated the shrinking performance of the different sleeves. The results are tabulated in Table 12.

TABLE 12
EFFECT OF % CROSSLINK ON SHRINKING CHARACTERISTIC OF SLEEVE

| | % Crosslink | Shrinking Characteristics of the W/A Tubular Sleeve |
|---|---|---|
| 1. | 70% | Rapid shrinkage on heat application, conformed tightly to pipe. |
| 2. | 65% | Rapid shrinkage. Conformed well. |
| 3. | 60% | Moderate rate of shrinkage but quite satisfactory. Conformed well. |
| 4. | 50% | Noticeably slower shrinking rate but satisfactory. Conformed well on cooling. |
| 5. | 45% | Sluggish shrinkage, but eventually shrunk down and conformed. |

DISCUSSION OF TEST RESULTS

Table 1 shows the strength of the sleeve at 2" and 4" extensions at 23° C., 142° C. and 175° C. The subsequent tables show the lap strength of overlaps at these temperatures, the overlap specimens having been prepared at 150° C. and 200° C. and under 0 p.s.i. and 0.75 p.s.i. pressure.

Generally, it is observed that whenever the overlap shear strength is lower than the measured sleeve strength at the given test temperature, the overlap fails. The effect of the sample preparation temperature and pressure on the overlap strength is also given so that the sensitivity of the different sleeve systems to preparation conditions can be evaluated.

Effect of Sample Preparation Temperature (Tables 2 and 3)

Tables 2 and 3 give comparisons of lap shear strengths of samples prepared at 150° C. and 200° C., and at 0 p.s.i. or 0.75 p.s.i. preparation pressure. The tests were conducted at 142° C. It was found that the lap shear strength exceeded the sleeve strength at 4" extensions for the LPW-LPW sample (i.e. W/A TUBULAR SLEEVE) and no shear and no failure occurred. The LPW-BUTYL-LPW also extended by 4" and the lap strength exceeded sleeve strength. There was no shear and no failure. The NITTO, RAYCHEM and CANUSA patch system sleeves all sheared off at less than 2.5" extension, and all had lap shear strength markedly lower than the sleeve strength. The NITTO and RAYCHEM samples also showed significant improvement in lap strength at 200° C. preparation temperature, indicating the sensitivity of these systems to heat input during application.

Effect of Sample Preparation Pressure (Tables 4 to 7)

Tables 4 to 7 show the comparisons of lap shear strength of the different sleeves when samples were prepared with 0 p.s.i. and 0.75 p.s.i. pressure. In other words, at 0 p.s.i. preparation, the overlap was simply laid on the underlap without any pressure, and then subjected to heat. The comparison was made on samples prepared at 150° C. and 200° C., and the tests were conducted at 142° C. and 175° C. It is clearly observed that the LPW-LPW (W/A TUBULAR) fusion bond even when prepared at 0 p.s.i. pressure performs extremely well under all conditions. It does not shear or fail when prepared at 150° C. or 200° C. or when tested at 23° C., 142° C. or 175° C. This shows the ease with which the fusion bond is formed and remains stable under all the conditions. This inference is verified when the lap shear strength values are compared with the LPW-LPW samples prepared at 0.75 p.s.i. pressure. The difference in the values is very marginal. All the LPW-LPW samples extended by 4" and there was zero shear of the lap, and no failure.

The unique quality of the shear-resistant hold-down adhesive strip is again highlighted in these results. The LPW-BUTYL-LPW samples prepared at 0 and 0.75 p.s.i. pressure and 150° C. and 200° C. temperature and tested at 142° C. and 175° C. all extended by 4" and there was zero shear, with no failure. However, at 23° C. test temperature, the extension was less than 2" and failure was by complete cohesive shear. However, the lap shear strength was only slightly lower than the sleeve sheet strength, indicating that the bond was still very strong for practical purposes. This behaviour also shows that even the high shear adhesive such as the "BUTYL" used here, and which does not fail at high temperature, is still liable to failure under different conditions owing the fact that it is still an external bonding medium, unlike the LPW-LPW fusion bond in the W/A TUBULAR sleeve, which is stable at all temperatures. The NITTO, RAYCHEM and CANUSA samples all failed by complete shear at 142° C. and 200° C. test temperature after less than 3" extension. The NITTO and RAYCHEM samples showed significant improvement in lap shear strength when the preparation force was increased from 0 to 0.75 p.s.i. This indicates the sensitivity of these systems to the pressure applied during application.

Effect of Test Temperature

Tables 8 and 9 give comparisons of lap shear strength of different sleeve systems when tested at 142° C. and 175° C. The samples were prepared at both 0 and 0.75 p.s.i. pressure.

It is clearly seen at the shrinking temperature of the various sleeve systems, i.e., between 140° C. and 175° C., that the LPW-LPW (W/A TUBULAR) and LPW-BUTYL-LPW did not shear, or fail at all, even after 4" extension. The lap strength in both cases exceeded the sleeve strength. On the other hand, the conventional wrap-around sleeve systems with closure patch, namely the NITTO, RAYCHEM and CANUSA sleeve samples, all failed by complete shear after less than 2.8" extension. The lap strength in all three types was lower than the sleeve strength.

Stability of Fusion Bond (Boil-Freeze Test)

Table 10 shows the lap shear strengths of various sleeve samples after they were boiled in water for 72 hours, and placed in a freezer at −50° C. for two hours. The samples were then tested at room temperature (23° C.) and at 142° C. An unstable or partial bond would have been weakened substantially after this temperature cycle test.

However, it is seen that the LPW-LPW (W/A TUBULAR) samples extended by 4" without any shear or failure and the lap strength exceeds the sleeve strength both at 23° C. and 142° C.

Although the RAYCHEM and CANUSA sleeve samples also extend to 4" at room temperature, they both failed after less than 2" extension at the shrinking temperature (142° C.) and had lap strength less than the sleeve strength at 142° C.

Effect of % Crosslinking of Fusion Bond

Table 11 shows the lap shear strength of LPW-LPW (W/A TUBULAR) when the LPW sheet was crosslinked to different levels. It is seen that at 70% crosslinking, the fusion bond is relatively weak and fails by disbonding, without shear, at 3.2" extension. At 45% to 65% crosslinking, the extension is 4" without any failure. However, at less than 60% crosslinking the lap strength drops significantly. This is not the indication of the lap shear strength, but rather the sleeve strength. The lap does not shear at all and is completely intact after extension; however, since the LPW sheet has lower crosslinking, the sleeve strength is correspondingly lower.

The effect of lower crosslinking and the resultant lower sleeve strength and lower shrinking force is given in Table 12. It is seen that the sleeves with more than 50% crosslinking shrink down rapidly, while those with less than 50% crosslinking shrink down sluggishly. It is therefore desirable to balance the degree of crosslinking to obtain an optimum fusion bond and good shrinking characteristics. The optimum degree of crosslinking for the LPW-LPW type W/A TUBULAR sleeves is 50% to 70%. However, the optimum degree of crosslinking will vary with the particular composition used, each such optimum value being determined using a method similar to that described above with reference to Tables 11 and 12. Generally, the optimum degree of crosslinking will be in the range 45% to 70%.

In one modification, the adhesive-free zone 23 may be provided with adhesive areas which may be in the form of small discrete adhesive areas or may be longitudinal strips of adhesives extending between the shear-resistant adhesive 21 and the coating 22 and which expose adhesive-free areas therebetween to permit the above-described fusion bonding to be effected. The adhesive areas may be of the same composition as the shear-resistant adhesive 21 or as the coating 22 in some cases. More preferably, they are a pressure-sensitive adhesive, and can serve to hold together firmly in intimate contact the sides of the sheet 20 which are to be fused together. This can be especially useful when forming a wrap-around sleeve around highly profiled joints e.g. a bell and a spigot pipe joint.

We claim:

1. A method of applying a close fitting protective covering to an article to be covered, which method comprises:
   providing a dimensionally heat unstable material in sheet form having longitudinally spaced end portions, the material having been stretched in the longitudinal direction from an original heat stable form to a dimensionally heat unstable form capable of moving in the direction of its original form by the application of heat alone,
   applying a hold-down adhesive to one side of the sheet across a transverse zone adjacent one of its ends, said zone being spaced from the other end by a distance greater than the girth of the article to be covered,
   wrapping the sheet around the article by laying the sheet against the article and overlapping said end portions, and bonding the adhesive-covered zone against the opposite side of the other end portion while leaving an adhesive-free zone at the interface between said overlapping end portions,
   applying heat externally to said overlapping end portions sufficient to effect a fusion bond therebetween at the adhesive-free interface, and
   further heating the material to shrink the sheet into close fitting relation with the article.

2. A method according to claim 1, wherein said fusion bond is effected initially at a restricted portion of said adhesive-free interface for maintaining the overlap during said further heating step, the fusion bond being subsequently completed over the whole of said adhesive-free interface.

3. A method according to claim 1, wherein said fusion bond is completed over the whole of said adhesive-free interface prior to said further heating step.

4. A method according to claim 1, wherein the material is a heat-recoverable polymeric material.

5. A method according to claim 4, wherein the material is a polyolefin, a blend of polyolefins, or a blend of a polyolefin with an olefin copolymer, or with an elastomer, or with a mixture thereof.

6. A method according to claim 5, wherein the material has been crosslinked to a degree of 25% to 80%.

7. A method according to claim 6, wherein the material has been crosslinked to a degree of 45% to 70%.

8. A method according to claim 1, wherein the side of the sheet laid against the article is lined with a functional coating leaving an exposed zone at which the fusion bond is effected.

9. A method according to claim 8 in which the functional coating is a sealant or an adhesive material.

10. A method according to claim 9 in which the coating is a sealant which is caused to flow during said further heating step so as to effect a seal between the covering and the surface of the article.

11. A method according to claim 10, wherein said sealant is a hot-melt adhesive.

12. A method according to claim 1, wherein the hold-down adhesive is a pressure-sensitive adhesive.

13. A method according to claim 12, wherein the hold-down adhesive is an isobutylene polymer, or a blend of isobutylene polymers, with a filler.

14. A method according to claim 1, wherein the hold-down adhesive is not pressure-sensitive at ambient temperature but develops pressure-sensitivity when heated.

15. A method according to claim 1, wherein the hold-down adhesive is constituted by a strip of double-sided adhesive transfer tape.

16. A method of applying a close fitting covering to an article to be covered, which method comprises:
   providing a plurality of sheets of dimensionally heat unstable material each having longitudinally spaced end portions, the material of each sheet having been stretched in the longitudinal direction from an original heat stable form to a dimensionally heat unstable form capable of moving in the direction of its original form by the application of heat alone,
   applying a hold-down adhesive to one side of each sheet across a transverse zone adjacent one of its ends,
   wrapping the sheets around the article in consecutive overlapping relation and adhesively bonding the overlapping end portions thereof in pairs while leaving an adhesive-free region at each interface therebetween, applying heat externally to the pairs of overlapping end portions sufficient to effect a fusion bond at the adhesive-free region of each said interface, and further heating the material to shrink the covering so formed into close fitting relation with the article.

17. A method according to claim 16, wherein said fusion bond is effected initially at a restricted portion of each said adhesive-free interface for maintaining the overlap during said further heating step, the fusion bond being subsequently completed over the whole of each said adhesive-free interface.

18. A method according to claim 16, wherein said fusion bond is completed over the whole of each said adhesive-free interface prior to said further heating step.

19. A method according to claim 16, wherein the material is a heat-recoverable polymeric material.

20. A method according to claim 19, wherein the material is a polyolefin, a blend of polyolefins, or a blend of a polyolefin with an olefin copolymer, or with an elastomer, or with a mixture thereof.

21. A method according to claim 20, wherein the material has been crosslinked to a degree of 25% to 80%.

22. A method according to claim 21, wherein the material has been crosslinked to a degree of 45% to 70%.

23. A method according to claim 16, wherein the side of the sheet laid against the article is lined with a functional coating leaving an exposed zone at which the fusion bond is effected.

24. A method according to claim 23 in which the functional coating is a sealant or an adhesive material.

25. A method according to claim 24 in which the coating is a sealant which is caused to flow during said further heating step so as to effect a seal between the covering and the surface of the article.

26. A method according to claim 25, wherein said sealant is a hot-melt adhesive.

27. A method according to claim 16, wherein the hold-down adhesive is a pressure-sensitive adhesive.

28. A method according to claim 26, wherein the hold-down adhesive is an isobutylene polymer, or a blend of isobutylene polymers, with a filler.

29. A method according to claim 16, wherein the hold-down adhesive is not pressure-sensitive at ambient temperature but develops pressure-sensitivity when heated.

30. A method according to claim 16, wherein the hold-down adhesive is constituted by a strip of double-sided transfer tape.

31. A heat shrinkable protective covering adapted to be applied to an article in wrapping relation thereto, comprising a dimensionally heat unstable material in flexible sheet form having longitudinally spaced end portions capable of being brought into overlapping relation when the sheet is applied to the article, the material having been stretched in the longitudinal direction from an original heat stable form to a dimensionally heat unstable form capable of moving in the direction of its original form by the application of heat alone, one side of the sheet having a covering of hold-down adhesive across a transverse zone adjacent one of its ends leaving an adhesive-free adjacent zone which is capable of being fusion bonded to the other side of the sheet when brought into overlapping relation with the other end portion, further comprising a layer of a functional coating covering one side of the sheet except at the region at which the fusion bond is to be effected.

32. A covering according to claim 31 wherein the layer of a functional coating covers an area of said one side of the sheet extending from said other end portion to said adhesive-free zone.

33. A covering according to claim 31 or 33 in which the functional coating is a sealant or an adhesive material.

34. A covering according to claim 31 or claim 32, wherein the functional coating is a hot-melt adhesive.

35. A covering according to claim 31 wherein said material is heat-recoverable polymeric material.

36. A covering according to claim 35, wherein said material is a polyolefin, a blend of polyolefins or a blend of a polyolefin with an olefin copolymer, or with an elastomer, or with a mixture thereof.

37. A covering according to claim 36, wherein the material has been crosslinked to a degree of 25% to 80%.

38. A covering according to claim 37, wherein the material has been crosslinked to a degree of 45% to 70%.

39. A covering according to claim 31, wherein the hold-down adhesive is a pressure-sensitive adhesive.

40. A covering according to claim 39, wherein the hold-down adhesive is an isobutylene polymer, or a blend of isobutylene polymers, with a filler.

41. A covering according to claim 31 wherein the hold-down adhesive is not pressure-sensitive at ambient temperature but develops pressure-sensitivity when heated.

42. A covering according to claim 31, wherein the hold-down adhesive is constituted by a strip of double-sided adhesive transfer tape.

43. A covering according to claim 31 including adhesive areas on said one side of the covering adjacent the hold-down adhesive covering exposing adhesive-free areas therebetween.

44. A covering according to claim 43 in which said adhesive areas comprise longitudinal strips or discrete areas of adhesive exposing one or more adhesive-free areas between them which are capable of being fusion bonded to the other side of the sheet.

45. A covering according to claim 43 or 44 in which said adhesive areas comprise pressure-sensitive adhesive.

* * * * *